US012769541B1

(12) United States Patent
Bernabe et al.

(10) Patent No.: US 12,769,541 B1
(45) Date of Patent: Oct. 20, 2026

(54) EFFICIENT VIDEOCONFERENCING SOFTWARE DISTRIBUTION VIA DYNAMIC MESH TECHNOLOGY

(71) Applicant: Zoom Video Communications, Inc., San Jose, CA (US)

(72) Inventors: William Thomas Bernabe, Northborough, MA (US); Nicholas Alexander Sieracki, Sylmar, CA (US); Michael Adrian White, Alpine, UT (US)

(73) Assignee: Zoom Communications, Inc., San Jose, CA (US)

( * ) Notice: Subject to any disclaimer, the term of this patent is extended or adjusted under 35 U.S.C. 154(b) by 94 days.

(21) Appl. No.: 18/243,840

(22) Filed: Sep. 8, 2023

(51) Int. Cl.
*G06F 16/00* (2019.01)
*G06F 8/71* (2018.01)

(52) U.S. Cl.
CPC .................................... *G06F 8/71* (2013.01)

(58) Field of Classification Search
CPC ........................................................ G06F 8/71
See application file for complete search history.

(56) References Cited

U.S. PATENT DOCUMENTS 7,096,493 B1 * 8/2006 Liu ...................... G06F 21/565 726/8
8,489,442 B1 7/2013 Mohler
8,917,847 B2 12/2014 Mai et al.
9,961,119 B2 5/2018 Bader-Natal et al.
9,967,403 B1 5/2018 Narayanaswamy
10,104,025 B2 10/2018 Beust
10,235,562 B2 3/2019 Shaburov et al.
10,680,899 B1 * 6/2020 Ibarra .................. H04W 88/16
11,558,257 B1 1/2023 Iyer et al.
(Continued)

FOREIGN PATENT DOCUMENTS

WO 2013001276 A1 1/2013
WO 2024091327 A1 5/2024

OTHER PUBLICATIONS

U.S. App. No. 17/211,130, "Advisory Action", Jul. 20, 2022, 4 pages.
(Continued)

*Primary Examiner* — Syed H Hasan
(74) *Attorney, Agent, or Firm* — Kilpatrick Townsend & Stockton LLP

(57) ABSTRACT

Systems and methods for efficient distribution of files to video conferencing client computing devices via dynamic mesh technology are provided. For example, a mesh service establishes a mesh network for client computing devices based on communication among client computing devices and elects a parent node for the mesh network. The mesh service further determines, for each client computing device in the mesh network, a target version of a file to be installed or stored on the client computing device and cause the target versions of the particular file to be distributed to the client computing devices through the mesh network. The distribution includes the parent node downloads the target versions of the file for the client computing devices in the mesh network. The child nodes download respective target versions of the file from the parent node and verify the authenticity of the downloaded target versions with the content distribution service.

20 Claims, 7 Drawing Sheets

(56) References Cited

U.S. PATENT DOCUMENTS

| | | | | |
|---|---|---|---|---|
| 11,689,591 | B2 | 6/2023 | Sieracki et al. | |
| 11,870,660 | B1 | 1/2024 | Shneyderman et al. | |
| 11,921,970 | B1 | 3/2024 | Hoover et al. | |
| 11,979,444 | B1 | 5/2024 | Sieracki et al. | |
| 2001/0042073 | A1* | 11/2001 | Saether | G06F 16/182 707/999.203 |
| 2002/0133611 | A1 | 9/2002 | Gorsuch et al. | |
| 2004/0133444 | A1* | 7/2004 | Defaix | G06F 8/71 717/122 |
| 2007/0299710 | A1 | 12/2007 | Haveliwala | |
| 2008/0005733 | A1* | 1/2008 | Ramachandran | G06F 8/65 717/168 |
| 2009/0024693 | A1* | 1/2009 | Achtermann | G06F 16/951 709/203 |
| 2010/0251177 | A1 | 9/2010 | Geppert et al. | |
| 2011/0271212 | A1 | 11/2011 | Jones et al. | |
| 2012/0023265 | A1 | 1/2012 | Liao | |
| 2012/0254305 | A1 | 10/2012 | Malkin et al. | |
| 2013/0191485 | A1 | 7/2013 | Spencer | |
| 2014/0101326 | A1* | 4/2014 | Stoica | H04L 67/104 709/228 |
| 2016/0073059 | A1* | 3/2016 | Bader-Natal | H04N 7/148 348/14.03 |
| 2019/0327103 | A1 | 10/2019 | Niekrasz | |
| 2019/0349212 | A1 | 11/2019 | Heins et al. | |
| 2020/0170057 | A1 | 5/2020 | Rakshit et al. | |
| 2020/0302817 | A1 | 9/2020 | Williams et al. | |
| 2020/0382618 | A1 | 12/2020 | Faulkner et al. | |
| 2020/0382745 | A1 | 12/2020 | Trenh et al. | |
| 2021/0383127 | A1 | 12/2021 | Kikin-Gil et al. | |
| 2022/0150154 | A1* | 5/2022 | Pethe | H04L 41/0803 |
| 2022/0247654 | A1 | 8/2022 | Springer | |
| 2023/0306117 | A1* | 9/2023 | Bower, III | G06F 21/554 |

OTHER PUBLICATIONS

U.S. App. No. 17/211,130, “Final Office Action”, Apr. 15, 2022, 27 pages.

U.S. App. No. 17/211,130, “Final Office Action”, Jun. 7, 2023, 24 pages.

U.S. App. No. 17/211,130, “Non-Final Office Action”, Jul. 30, 2021, 20 pages.

U.S. App. No. 17/211,130, “Non-Final Office Action”, Oct. 11, 2022, 24 pages.

U.S. Appl. No. 17/515,488, “Notice of Allowance”, Jan. 25, 2023.

Nagpure, et al., “Eye Motion Detection Using Single Webcam for Person with Disabilities”, International Journal of Engineering Research & Technology, vol. 3, Issue 3, Mar. 2021, pp. 2199-2203.

Zhao, et al., “Hand Detection Using Cascade of Softmax Classifiers”, Advances in Multimedia, vol. 2018, Jul. 2018, pp. 1-11.

U.S. Appl. No. 18/143,123, “Notice of Allowance”, Jan. 8, 2024, 17 pages.

U.S. Appl. No. 18/243,720, “Non-Final Office Action”, Jun. 4, 2025, 9 pages.

PCT/US2024/042229, “International Search Report and Written Opinion”, Oct. 30, 2024, 12 pages.

U.S. Appl. No. 18/243,720 , Final Office Action, Mailed On Dec. 12, 2025, 10 pages.

U.S. Appl. No. 18/243,720 , Notice of Allowance, Mailed On Apr. 15, 2026, 6 pages.

U.S. Appl. No. 18/652,209 , Final Office Action, Mailed On Feb. 19, 2026, 21 pages.

U.S. Appl. No. 18/652,209 , Non-Final Office Action, Mailed On Sep. 10, 2025, 17 pages.

Application No. PCT/US2024/042229 , International Preliminary Report on Patentability, Mailed On Mar. 19, 2026, 8 pages.

* cited by examiner

EFFICIENT VIDEOCONFERENCING SOFTWARE DISTRIBUTION VIA DYNAMIC MESH TECHNOLOGY

FIELD

The present application generally relates to video conferencing, and more particularly relates to efficient distribution of videoconferencing software to client computing devices via dynamic mesh technology.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
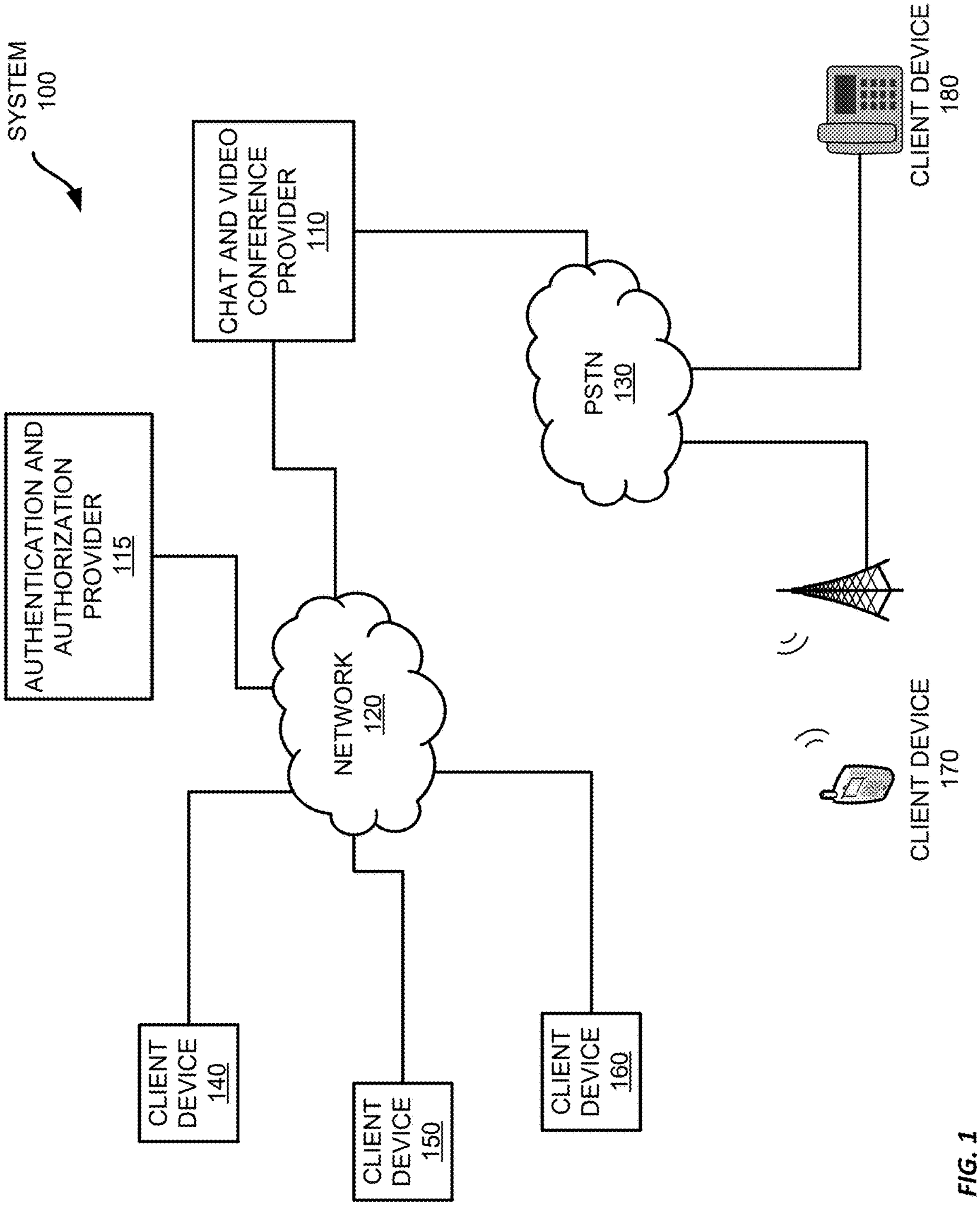
FIG. 1 shows an example system that provides videoconferencing functionality to various client devices, according to certain aspects described herein.

Examples are described herein in the context of systems and methods for efficient distribution of video conferencing software or files to video conferencing client computing devices via dynamic mesh technology. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

However, it can be challenging to manage the videoconferencing software to ensure that the videoconferencing software installed on the client computing devices of participants are updated in time so that the participants are not prevented from joining the video conference due to out-of-date videoconferencing software. Further, current videoconferencing software updates require each client computing device to download the entire update package via the site's Internet connection. As a result, organizations, especially those with large campuses, will consume substantial bandwidth when the videoconferencing software updates are processed. Since the same package will be used across the multiple client computing devices, this updating process becomes inefficient at scale.

To solve the above problems, example systems and methods for efficient distribution of conferencing software or files to video conferencing client computing devices via dynamic mesh technology are provided herein. As described herein, a mesh service is configured to establish one or more mesh networks for client computing devices for which the video conferencing software or other types of files are to be distributed. The client computing devices in each mesh network is determined to be in a same local network. The determination can be made by the mesh service based on information collected from the client computing devices, such as the network information (e.g., IP addresses, subnets, etc.) and communications among the client computing devices (e.g., multicast responses among the client computing devices).

For each mesh network, the mesh service further selects a client computing device as the parent node ("primary parent node") of the mesh network and one or more secondary parent nodes. The remaining client computing devices are the child nodes of the mesh network. The mesh service can notify the client computing devices in the mesh network their respective roles in the mesh network. In some examples, the mesh service selects at least two parent nodes with one as the primary parent node and the other one as the secondary parent node.

The mesh service further determines the version of the videoconferencing software that should be installed or files that should be stored on each client computing device in the mesh network, referred to herein as the "target version" of the videoconferencing software or file. The mesh service can notify the respective client computing devices in the mesh network the target versions of the videoconferencing software or file. The mesh service further instructs the parent node of the mesh network to download, from a content distribution service, the target versions of the videoconferencing software or file for all the client computing devices in the mesh network. In other words, if the client computing devices in the mesh network (including both parent nodes and child nodes) require N different target versions of the videoconferencing software or file, the parent node is instructed to download the N different target versions of the videoconference software or file even if one or more of the N target versions are not compatible with the parent node. The mesh service further instructs each child node to download the corresponding target version of the videoconferencing software or file from the parent node. In some examples, the network connection between the child node and the parent node for downloading the videoconferencing software is a secured connection.

To further increase the security of the file distribution process, each child node is configured to verify the authenticity of the downloaded videoconferencing software or file with the content distribution service. For example, the child node can be configured to generate a hash of the downloaded videoconferencing software or file and transmit the hash to the content distribution service. The content distribution service can verify the authenticity of the videoconferencing software or file based on the hash. The child node can install the downloaded videoconferencing software or store the file after the content distribution service confirms the authenticity of the videoconferencing software or file.

The mesh service can dynamically update the mesh network based on the information provided by the client computing devices, for example, by selecting new parent nodes for an existing mesh network, redefining the mesh networks to include new client computing devices or remove existing client computing devices, and so on. In scenarios where the primary parent node is unavailable, the child nodes can be instructed or configured to restart the downloading from a secondary parent node. If no parent node in the mesh network is available, the child nodes can be instructed or configured to download the target versions of the videoconferencing software or file from the content distribution service directly.

As described herein, certain embodiments provide improvements to video conferencing software distribution by solving problems that are specific to online platforms. These improvements include more efficiently organize client computing devices into mesh networks thereby utilizing the mesh peer-to-peer distribution to relay the videoconferencing software or files to the respective child nodes. In this way, the bandwidth consumption in the network between the local network and the content distribution service can be significantly reduced. Further, by efficiently distributing the most update-to-date versions of the videoconferencing software or files to client computing devices, video conferences among the participants associated with these client computing devices can be conducted more smoothly and efficiently.

While the examples described in this disclosure mostly focus on distributing the videoconferencing software or file, the same technology can be used to distribute other types of software or binary executables, or other types of files, such as images, video files, audio files. Similar to the distribution of the videoconferencing software or file, the efficient distribution technology via dynamic mesh can also improve the distribution of other types of files over online platforms by significantly reducing the network bandwidth consumption between the local network and the content distribution service that host the files.

This illustrative example is given to introduce the reader to the general subject matter discussed herein and the disclosure is not limited to this example. The following sections describe various additional non-limiting examples and examples of systems and methods for efficient distribution of files to client computing devices via dynamic mesh technology.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
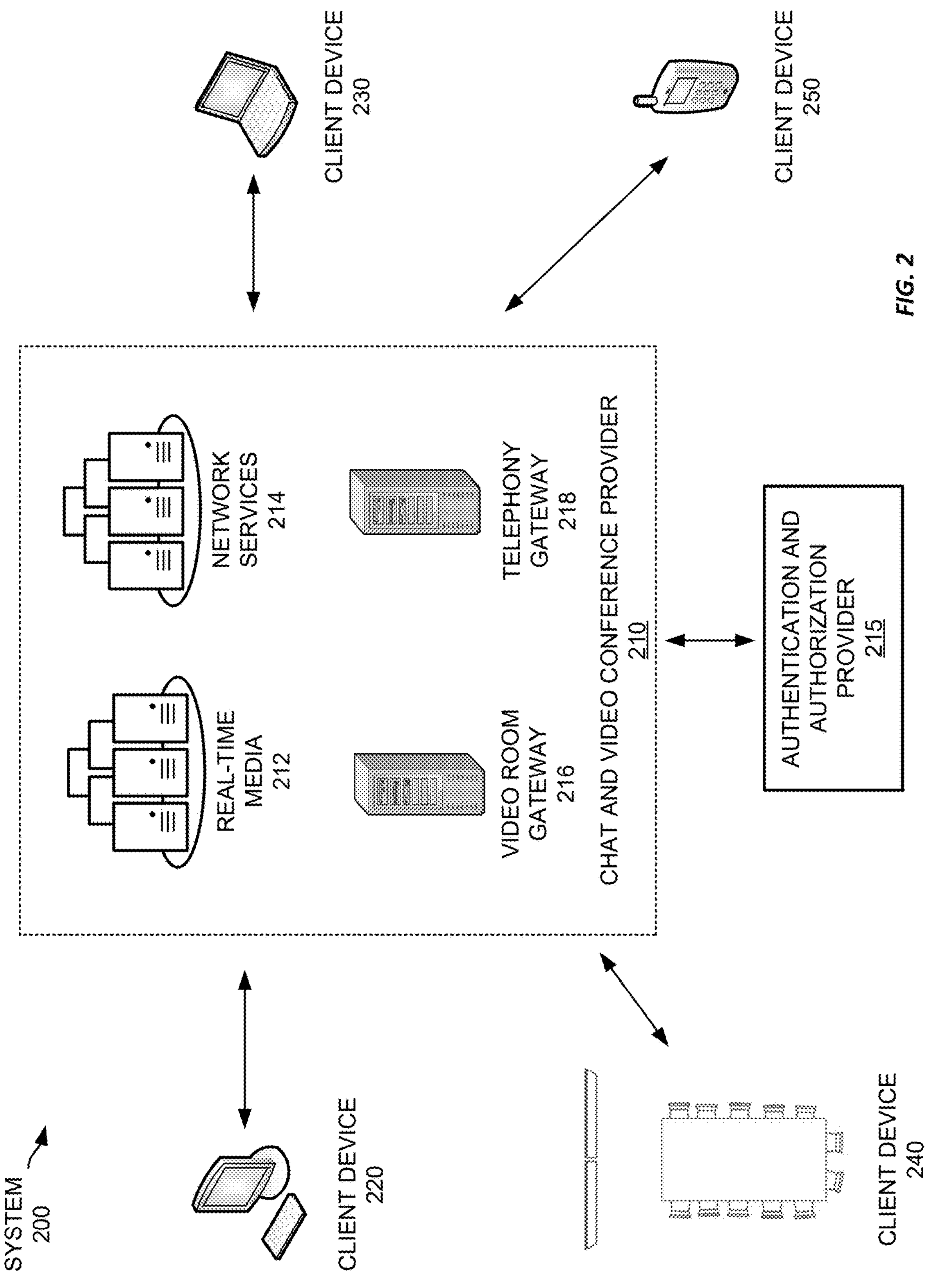
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers

214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
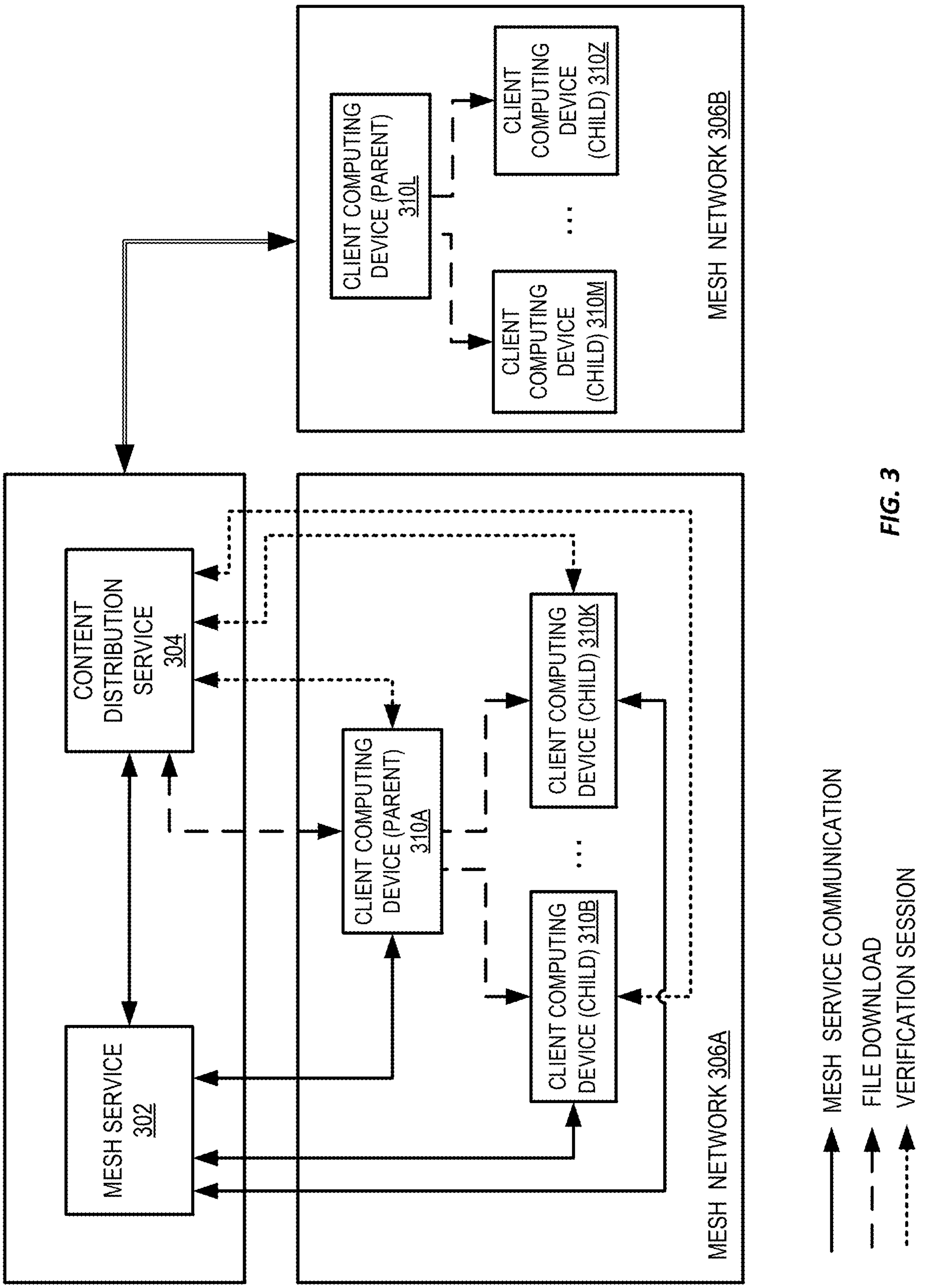
FIG. 3 shows an example of an operating environment for efficient distribution of files to video conferencing client computing devices via dynamic mesh technology, according to certain aspects of the present disclosure.

Referring now to FIG. 3, FIG. 3 shows an example of an operating environment 300 for efficient distribution of files to client computing devices via dynamic mesh technology, according to certain aspects described herein. The operating environment 300 includes a content distribution service 304 configured to host and deliver files to client computing devices 310A-310Z (which may be referred to herein individually as a client computing device 310 or collectively as the client computing devices 310). The files may be binary executables such as videoconferencing software executables, or non-executables such as images, video, audios, and so on. The content distribution service 304 may be a content distribution network (CDN). The client computing devices may be the client devices 140-180 and 220-250 discussed above with respect to FIGS. 1 and 2 or may be other types of client computing devices that have files to be installed or stored. The operating environment 300 further includes a mesh service 302 configured to establish and maintain one or more mesh networks for the client computing devices 310 and provide instructions to the client computing devices 310 to obtain the correct versions of the files through the mesh networks.

To establish the mesh networks, each client computing device 310 transmits network information to the mesh service 302. The network information can include IP address of the client computing devices 310, the subnet of the client computing devices 310, and so on. Further, each client computing device 310 can explore its neighbors by sending multicast packets and receiving responses to the multicast packets. The multicast responses received by the sending device can be used to determine the condition of the connection between the sending client computing device and receiving client computing device, such as quality of links, latency loss, connectivity, and so on. Based on the condition of the connection, the network distance and latency between the sending device and each receiving device can be determined. Each client computing device 310 can be configured to send the multicast responses to the mesh service 302 periodically so that the mesh service 302 can dynamically determine a topology map indicating the network locations of the client computing devices 310. For client computing devices 310 that did not send multicast responses, the mesh service 302 can use the network information to determine their locations within the network.

Based on the determined locations of the client computing devices 310, the mesh service 302 can identify client computing devices 310 that are in a same local network and build a mesh network for those client computing devices 310. As shown in the example of FIG. 3, client computing devices 310A-310K are identified as being in the same local network and thus is grouped into one mesh network 306A. Likewise, client computing devices 310L-310Z are identified as being in the same local network and are grouped into another mesh network 306B. Additional mesh networks may be constructed for other client computing devices 310 depending on their locations. Mesh networks may be referred to herein individually as a mesh network 306 or collectively as the mesh networks 306.

For each mesh network 306, the mesh service 302 further selects a client computing device 310 as the parent client computing device (also referred to as "parent node") and the remaining client computing devices are the child client computing device of the mesh network 306 (also referred to as "child nodes"). In the example shown in FIG. 3, client computing device 310A is elected as the parent node for mesh network 306A and client computing device 310L is elected as the parent node for mesh network 306B.

The parent node can be selected based on the configuration of the client computing devices 310 in the mesh network. For example, each client computing device 310 can be configured to transmit the device information including system configuration to the mesh service 302, such as the CPU type, memory size, hard disk, network type and configuration (e.g., local simultaneous download limit). By comparing the system configurations of the client computing devices 310 in a mesh network 306, the mesh service 302 can select a client computing device 310 that meets a pre-determined criteria for a parent node (e.g., having computing power and storage space higher than a threshold value) as the parent node for the mesh network. In some implementations, the criteria can be specified through an administrator portal. The criteria may further specify certain client computing devices 310 are excluded from being selected as a parent node, such as a client computing device 310 associated with an executive of the organization. In some examples, the mesh service 302 determines the mesh network based on a ratio between the parent node and the child nodes. For example, if a mesh network has a parent-to-child ratio smaller than a threshold (i.e., there are too many child nodes per parent node), the mesh service 302 can split the mesh network into two or more mesh networks.

In some examples, the parent node is the primary parent node of the mesh network. The mesh service 302 further identifies one or two secondary parent nodes for the mesh network so that a secondary parent node can be promoted to the primary parent node when the primary parent node becomes unavailable. If there is a parent node becoming unavailable, the mesh service 302 elects another client computing device 310 as the parent node so that the total number of parent nodes (including primary parent node and secondary parent nodes) remains the same. The mesh service 302 further notifies the client computing devices 310 in the mesh network 306 their respective roles in the mesh network 306.

To determine the correct files to be distributed to the client computing devices 310, the mesh service 302 further maintains a list of files that should be installed or stored on the respective client computing devices 310, referred to as the "target version" of the files. In further examples, the mesh service 302 further collects the current files installed or stored on the respective client computing devices 310 and determines whether those files need to be updated. The mesh service 302 can notify the respective client computing devices 310 in the mesh network 306 their respective target versions.

The mesh service 302 further instructs the primary parent node of each mesh network 306 to download, from the content distribution service 304, the target versions of the files for the client computing devices in the respective mesh networks 306. In other words, if the client computing devices 310 in a mesh network 306 (including both parent nodes and child nodes) require N different target versions of files, the parent node is instructed to download the N different target versions of the files even if one or more of the N target versions are not compatible with the parent node. The mesh service 302 further instructs each child node to download the corresponding target version of the file from their respective parent nodes.

In some examples, the network connection between the parent node and the content distribution service 304 and between the child node and the parent node for downloading the files is a secured connection as shown in FIG. 3, such as a transport layer security (TLS) connection. This allows the files to be transmitted securely reducing the risks of the files being tampered or otherwise attacked. To further increase the security of the file distribution process, each child node is configured to verify the authenticity of the downloaded file with the content distribution service 304. For example, the child node can be configured to generate a hash of the downloaded file and transmit the hash to the content distribution service 304 shown as the "verification session" in FIG. 3. The content distribution service 304 can verify the authenticity of the file based on the hash. The child node can install the downloaded file after the content distribution service 304 confirms the authenticity of the file. In some implementations, the parent node also verifies the authenticity of its target version of the file with the content distribution service 304 in a similar way.

The mesh service 302 can be configured to dynamically update the mesh networks 306 based on the information provided by the client computing devices 310, for example, by redefining the mesh networks 306, selecting new parent nodes for an existing mesh network 306, and so on. In scenarios where the primary parent node is unavailable, the child nodes can be instructed or configured to restart the downloading from the secondary parent node. If no parent node in the mesh network is available, the child nodes can be instructed or configured to download the target versions of the files from the content distribution service 304 directly.

Note that while FIG. 3 only illustrates two mesh networks, fewer or more mesh networks may be established in a similar way as described herein to efficiently distribute the files to client computing devices. The communications among the nodes in each mesh network, the mesh service, and media service are similar to those communications described above with respect to mesh network 306A. Further, the various services shown in FIG. 3 are for illustrative purposes only and should not be construed as limiting. Various other services and other arrangements can also be employed to implement the technology described herein.

Figure 4:
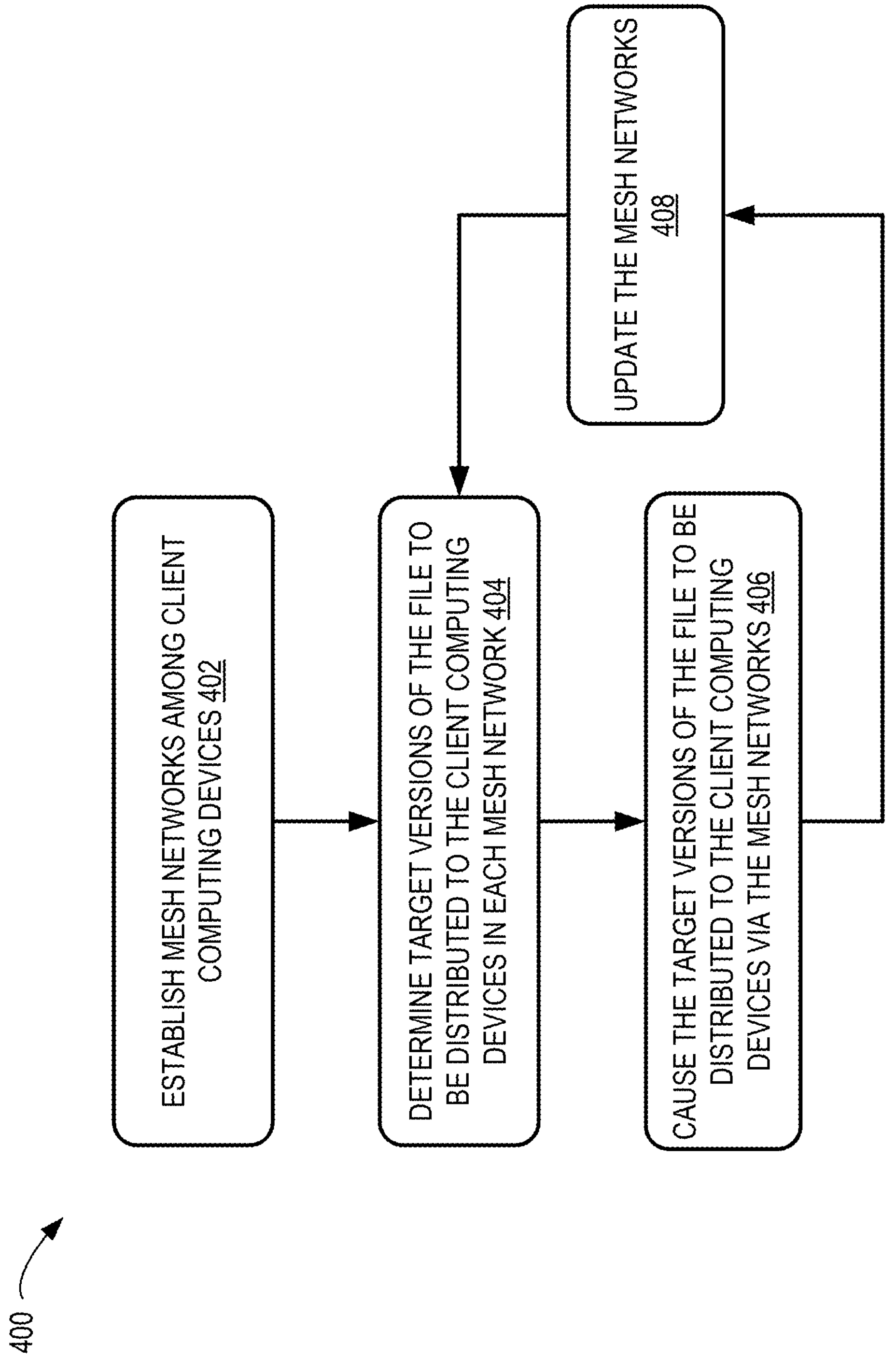
FIG. 4 shows a flowchart of an example process for efficient distribution of files to video conferencing client computing devices via dynamic mesh technology, according to certain aspects of the present disclosure.

Referring now to FIG. 4, FIG. 4 shows a flowchart of an example process 400 for efficient distribution of files to client computing devices via dynamic mesh technology, according to certain aspects of the present disclosure. The mesh service 302 can be configured to implement operations depicted in FIG. 4 by executing suitable program code. The software or program code may be stored on a non-transitory storage medium (e.g., on a memory device). The process depicted in FIG. 4 and described below is intended to be illustrative and non-limiting. Although FIG. 4 depicts the various processing blocks occurring in a particular sequence or order, this is not intended to be limiting. In certain alternative embodiments, the blocks may be performed in some different order, or some blocks may also be performed in parallel. For illustrative purposes, the process 400 is described with reference to certain examples depicted in the figures. Other implementations, however, are possible.

At block 402, the process 400 involves establishing one or more mesh networks 306 for client computing devices 310. The mesh service 302 receives network information (e.g., the IP addresses and subnet information) from the client computing devices 310. The mesh service 302 further receive responses to multicast packets sent by individual client computing devices 310 to their neighboring devices. Based on the multicast responses and the network information, the mesh service 302 can determine the locations of the client computing devices 310 relative to each other thereby determining the client computing devices 310 that can be grouped into one mesh network. For each mesh network, the mesh service 302 determines each of the client computing devices 310 as a parent node or a child node and notifies the roles of the respective client computing devices 310 in each mesh network 306. In some examples, the mesh service 302 establishes the mesh networks in response to a request from an organization. In other examples, the mesh service 302 automatically establishes the mesh networks based on the data received from the client computing devices 310. If the mesh service 302 is able to group two or more client computing devices 310 into a mesh network and to identify a parent node for the mesh network, the mesh network can be established; otherwise, the mesh network is not established and the client computing devices 310 not belonging to any mesh network can download the files directly from the content distribution service 304. Additional details about establishing one or more mesh networks 306 for client computing devices 310 are provided below with respect to FIG. 5.

At block 404, the process 400 involves determining target versions of the file to be distributed to the client computing devices 310 in each mesh network 306. In some examples, the mesh service 302 can maintain a list of target versions of the file that should be installed or stored on the respective client computing devices 310. The list of target versions of the file can be determined based on the configuration of the respective client computing devices 310, such as the operating system, the CPU type, the memory space, and so on. For example, a most recent Mac® version of the software executables should be the target version of a client computing device 310 that has the latest macOS® operating system. Likewise, an Android® version of the software executables should be the target version of an Android® mobile phone. In further examples, the mesh service 302 can obtain the current version of the file installed or stored on the client computing devices 310 (e.g., by requesting each client computing device 310 to report their respective current versions). The mesh service 302 can update the list of target versions of the file to remove the target versions that have already been installed or stored on the client computing devices 310. The mesh service 302 can maintain and update the list of current versions for the client computing devices 310 by requesting the client computing devices 310 to report their respective current versions of the file after each successful distribution (installation or storage).

At block 406, the process 400 involves causing the target versions of the file to be distributed to the client computing devices 310 through the mesh networks 306. For each mesh network, the mesh service 302 can instruct the parent node to download, from the content distribution service 304, the target versions of the file for the client computing devices 310 in the mesh network even if some of the target versions of the file are incompatible with the parent client computing device. For instance, the mesh network has five client computing devices (including the parent node) and these five client computing devices require three different versions of the executables of the videoconferencing software. The five client computing devices include two Mac® computers, two Windows® computers, and one Android® phone. The parent client computing device is one of the two Windows® computers. The required target versions thus include a Mac® version, a Windows® version and an Android® version of the videoconferencing software. As a result, the parent node needs to download all three versions of the videoconferencing software, even though the Mac® version and the Android® version of the software cannot be installed on the parent node. The mesh service 302 can further instruct each child node to download the corresponding target version of the file from the parent node. Additional details about distributing the file via the mesh network are provided below with respect to FIG. 6.

At block 408, the process 400 involves updating the mesh networks 306. The client computing devices 310 may be moving after a time period, such as a mobile device moves from one location to another location. In addition, the estimated locations of the client computing devices 310 may not be accurate and thus the mesh service 302 can be configured to improve the estimation based on additional information about the client computing devices 310. As such, the client computing devices 310 can be configured to continuously send updated network information and multicast responses to the mesh service 302. Based on the updated information, the mesh service 302 can update the estimated location information of the client computing devices 310 and subsequently update the mesh networks so that client computing devices 310 in a same local network is grouped into one mesh network. With the updated mesh networks, the mesh service 302 can continue to manage the file distribution through the mesh networks as described with respect to blocks 404 and 406.

Figure 5:
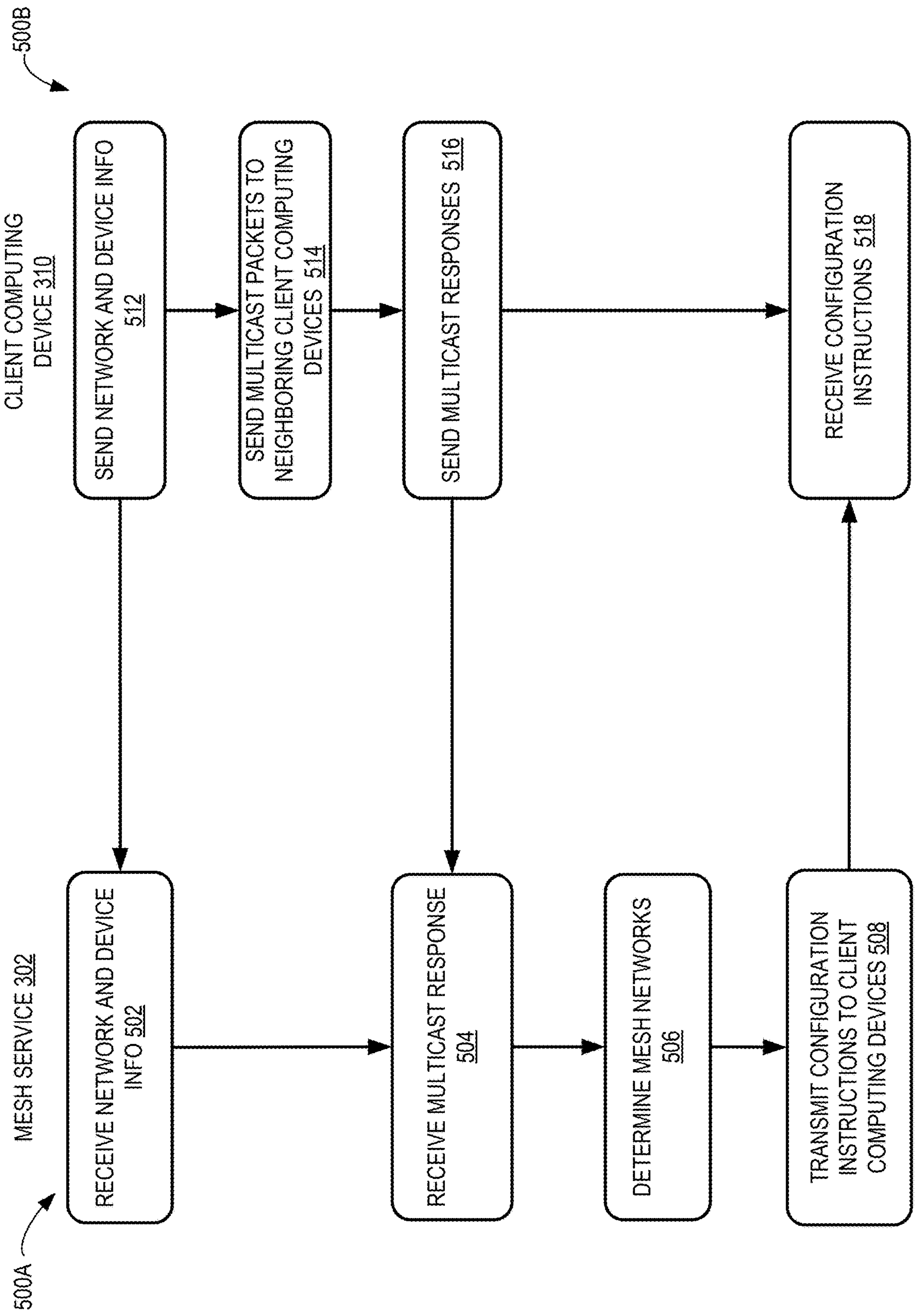
FIG. 5 includes several flow charts depicting several processes for establishing mesh networks for client computing devices, according to certain aspects of the present disclosure.

Referring now to FIG. 5, FIG. 5 includes several flow charts depicting several processes 500A and 500B for establishing mesh networks for client computing devices, according to certain aspects of the present disclosure. The mesh service 302 can be configured to implement process 500A depicted in FIG. 5 by executing suitable program code. The process 500A can be utilized to implement block 402 or block 408 of FIG. 4. The client computing device 310 can be configured to implement process 500B depicted in FIG. 5 by executing suitable program code (e.g., the videoconferencing software). Other implementations, however, are possible. The process depicted in FIG. 5 and described below is intended to be illustrative and non-limiting. Although FIG. 5 depicts the various processing blocks occurring in a particular sequence or order, this is not intended to be limiting. In certain alternative embodiments, the blocks may be performed in some different order, or some blocks may also be performed in parallel. For illustrative purposes, the process 500A and 500B are described with reference to certain examples depicted in the figures. Other implementations, however, are possible. The processes 500A and 500B will be described together below.

At block 512, the process 500B involves the client computing device 310 sending network information and device information to the mesh service 302. As discussed above with respect to FIG. 3, the network information can include the IP address and subnet of the client computing devices 310 as well as other network related information. The device information can include the system configuration of the client computing device 310 such as the operating system, CPU type, memory size, hard disk information, network connection and so on. At block 514, the process 500B involves the client computing device 310 sending multicast packets to neighboring client computing devices. The client computing device 310 further receives the responses to the multicast packets and, at block 516, sending the multicast responses to the mesh service 302.

At block 502, the process 500A involves the mesh service 302 receiving the network information and device information from the client computing device 310 and other client computing devices 310. At block 504, the process 500A involves receiving the multicast responses from the client computing device 310 and other client computing devices 310. At block 506, the process 500A involves determining mesh networks for the client computing devices 310. As discussed above with respect to FIG. 3, the mesh service 302 can determine, from the multicast responses received by sending devices, the condition of the connection between the sending client computing device and receiving client computing device, such as quality of links, latency loss, connectivity, and so on. Based on the condition of the connection, the distance and latency between the sending device and each receiving device can be determined and the locations of the client computing devices 310 relative to each other can also be determined. Based on the relative locations of the client computing devices 310, the mesh service 302 can determine which set of client computing devices 310 are in the same local network and thus can be grouped into one mesh network.

For each of the mesh network, the mesh service 302 further selects a client computing device 310 as the parent node of the mesh network 306 ("primary parent node"). The parent node can be selected based on the configuration in the device information of the client computing devices 310 received at block 502, such as the CPU type, memory size, hard disk of the client computing device 310. For example, the mesh service 302 can select a client computing device 310 that meets a pre-determined criteria for a parent node (e.g., having sufficient computing power and storage space) as the parent node for the mesh network. In some implementations, the criteria can be specified through an administrator portal. For example, the criteria may specify that a client computing device 310 with location storage larger than a pre-determined amount can be selected as the parent node. The criteria may further specify certain client computing devices 310 are excluded from being elected as a parent node, such as a client computing device 310 associated with an executive of the organization.

In some implementations, the mesh service 302 further identifies one or two secondary parent nodes for the mesh network 306 so that a secondary parent node can be promoted to the primary parent node when the primary parent node becomes unavailable. If there is a parent node (primary or secondary) becoming unavailable, the mesh service 302 elects another client computing device 310 as a parent node so that the total number of parent nodes remains the same. The client computing devices 310 that are not elected as a parent node are the child nodes of the mesh network 306.

At block 508, the process 500A involves transmitting configuration instructions to client computing devices 310. In some examples, the configuration instructions to each client computing device 310 in a particular mesh network include the roles of all the client computing devices 310 in that particular mesh network. As a result of receiving the configuration instructions, each node in a mesh network is made aware of all the nodes in that mesh network. In other examples, the configuration instructions to a client computing device 310 in a particular mesh network include the role of the client computing device 310 and the primary and secondary parent nodes of that particular mesh network. The configuration instructions to a parent node include the roles of all the client computing devices 310. As a result of receiving the configuration instructions, a parent node is made aware of all the nodes in the mesh network and a child node is made aware of only the primary parent node and secondary parent node(s). At block 518, the process 500B involves the client computing device 310 receiving the configuration instructions. As discussed above, because the client computing devices 310 may be moving and the network conditions may be changing, the processes 500A and 500B can be periodically performed to keep the mesh networks updated, such as every 5-10 seconds.

Figure 6:
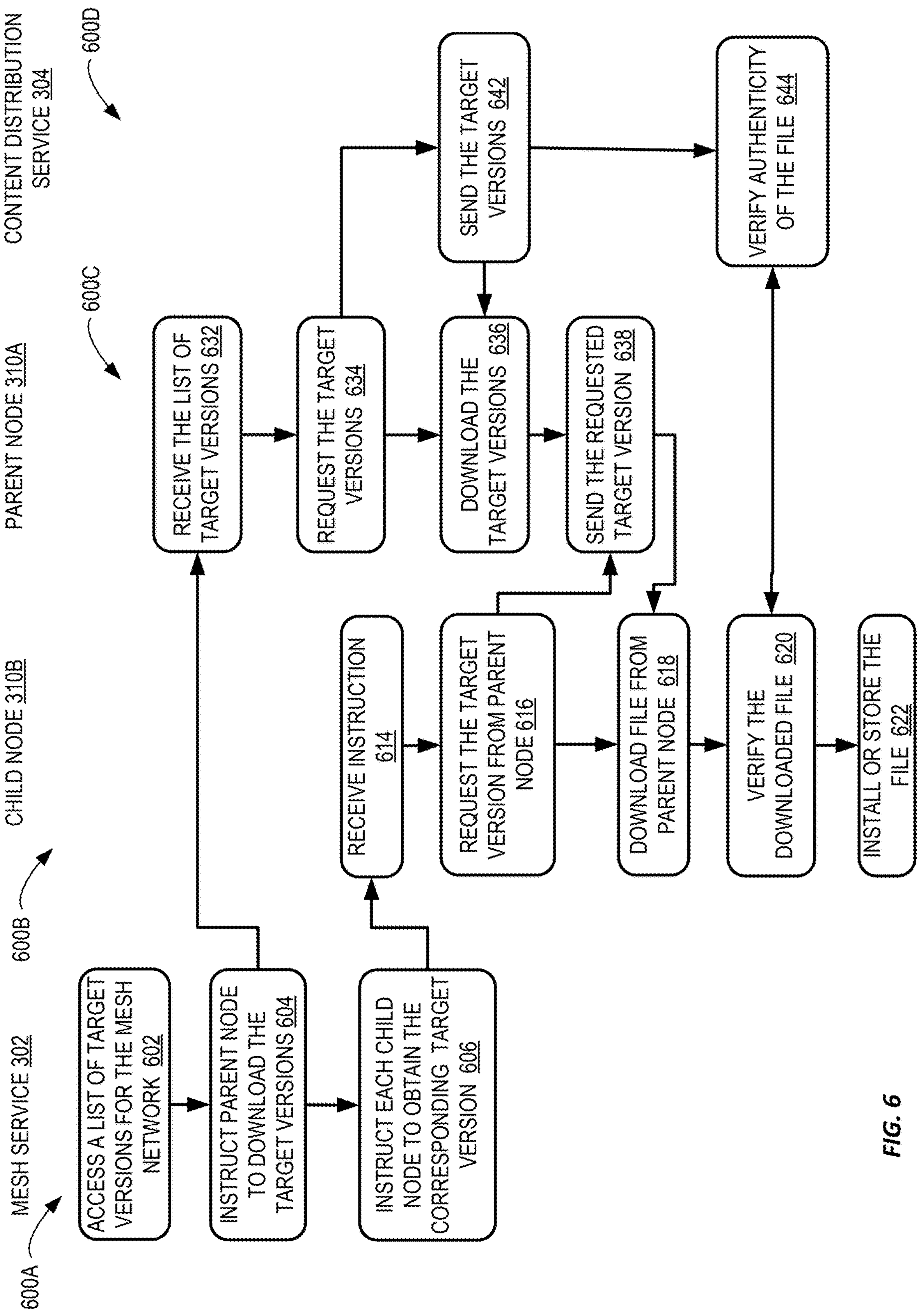
FIG. 6 includes several flow charts depicting several processes for distributing files to video conferencing client computing devices via a mesh network, according to certain aspects of the present disclosure.

Referring now to FIG. 6, FIG. 6 includes several flow charts depicting several processes 600A, 600B, and 600B for distributing files to client computing devices via a mesh network, according to certain aspects of the present disclosure. The mesh service 302 can be configured to implement process 600A depicted in FIG. 6 by executing suitable program code. The process 600A can be utilized to implement block 406 of FIG. 4. The child client computing device 310B can be configured to implement process 600B depicted in FIG. 6 by executing suitable program code (e.g., the videoconferencing software). The parent client computing device 310A can be configured to implement process 600C depicted in FIG. 6 by executing suitable program code (e.g., the videoconferencing software). The content distribution service 304 can be configured to implement process 600D depicted in FIG. 6 by executing suitable program code. Other implementations, however, are possible.

The process depicted in FIG. 6 and described below is intended to be illustrative and non-limiting. Although FIG. 6 depicts the various processing blocks occurring in a particular sequence or order, this is not intended to be limiting. In certain alternative embodiments, the blocks may be performed in some different order, or some blocks may also be performed in parallel. For illustrative purposes, the process 600A-600D are described with reference to certain examples depicted in the figures. Other implementations, however, are possible. The processes 600A-600D will be described together below.

At block 602, the process 600A involves the content distribution service 304 accessing a list of target versions of the file to be distributed to the client computing devices 310 in the mesh network. At block 604, the process 600A involves instructing the parent node of the mesh network to download all the target versions of the file according to the list. At block 606, the process 600A involves instructing each child client computing device 310 to obtain their respective target versions from the corresponding parent node. The instruction may specify the download schedule for the child nodes, such as by specifying a time and interval for requesting the target version of the file from the parent node.

At block 632, the process 600C involves the parent node 310A receiving the list of target versions of the file. At block 634, the process 600C involves the parent node 310A requesting the target versions of the file from the content distribution service 304. At block 642, the process 600D involves the content distribution service 304 sending the requested target versions of the file to the parent client computing devices 310A. At block 636, the process 600C involves the parent node 310A downloading the target versions of the file from the content distribution service 304. In some implementations, the parent client computing device 310A downloads the target versions of the file from the content distribution service 304 through a secured connection, such as a transport layer security (TLS) connection to increase the security of the file transfer.

At block 614, the process 600B involves the child client computing device 310B receiving instructions from the mesh service 302 to download the target version for the child client computing device 310B. The child client computing device 310B can determine if it already has the target version. If so, the child client computing device 310B can ignore the instruction. If the child client computing device 310B does not have the target version, at block 616, the process 600B involves the child client computing device 310B requesting the target version from the parent client computing device 310A. At block 638, the process 600C involves the parent client computing device 310A transmitting the target version for the child client computing device 310B to the child client computing device 310B in response to the request. At block 618, the process 600B involves the child client computing device 310B downloading the target version from the parent client computing device 310A. In some implementations, the child client computing device 310B downloads the target version of the file from the parent client computing device 310A through a secured connection, such as a TLS connection to increase the security of the file transfer.

At block 620, the process 600B involves the child client computing device 310B verifying the authenticity of the downloaded target version of the file with the content distribution service 304. In some examples, the child client computing device 310B can generate a hash of the downloaded file and transmits the hash to the content distribution service 304. The content distribution service 304 can verify the authenticity of the file based on the hash, at block 644. For example, the content distribution service 304 can generate another hash for the target version of the file stored on the content distribution service 304 and compare the generated hash with the received. If the two hashes match, the content distribution service 304 can determine that the target version of the file downloaded by the child client computing device 310B is an authentic version; otherwise, the download file is a tampered version. The content distribution service 304 returns the verification results to the child client computing device 310B. Based on determining that the downloaded target version of the file is authentic, the process 600B involves, at block 622, the child client computing device 310 installing or storing the downloaded file on the child client computing device 310B. If the verification results indicate that the downloaded version is not an authentic file, the child client computing device 310B can send a warning message to the mesh service 302 indicating that the parent client computing device 310A may have been compromised. Based on the warning message, the mesh service 302 may remove or otherwise isolate the parent client computing device 310A from the mesh network and select a new parent node.

The processes depicted in FIGS. 4-6 are for illustration only and should not be construed as limiting. Various other ways or additional ways to distribute the target versions of a file to the client computing devices 310 via the mesh network can be implemented. For example, in FIG. 6, if the child client computing device 310B detects that the primary parent client computing device 310A is unavailable, the child client computing device 310B can request the target version from the secondary parent node in the same mesh network. If the child client computing device 310B detects that no parent node is available in the mesh network, the child client computing device 310B can request the content directly from the content distribution service 304. This can be implemented by configuring the child client computing devices, such as by configuring the videoconferencing software, or by instructing the child client computing devices via the instruction sent at block 606. Further, the mesh service 302 may be configured to instruct the parent client computing device 310A to delete old versions of the file (e.g., versions that are older than the oldest version in the list of target versions) from time to time to free up storage spaces on the parent client computing device 310A. In addition, the parent client computing device 310A can also be configured to verify the authenticity of the downloaded file(s) with the content distribution service 304 in the same way as described with regard to blocks 620 and 644. Other implementations are also possible.

Figure 7:
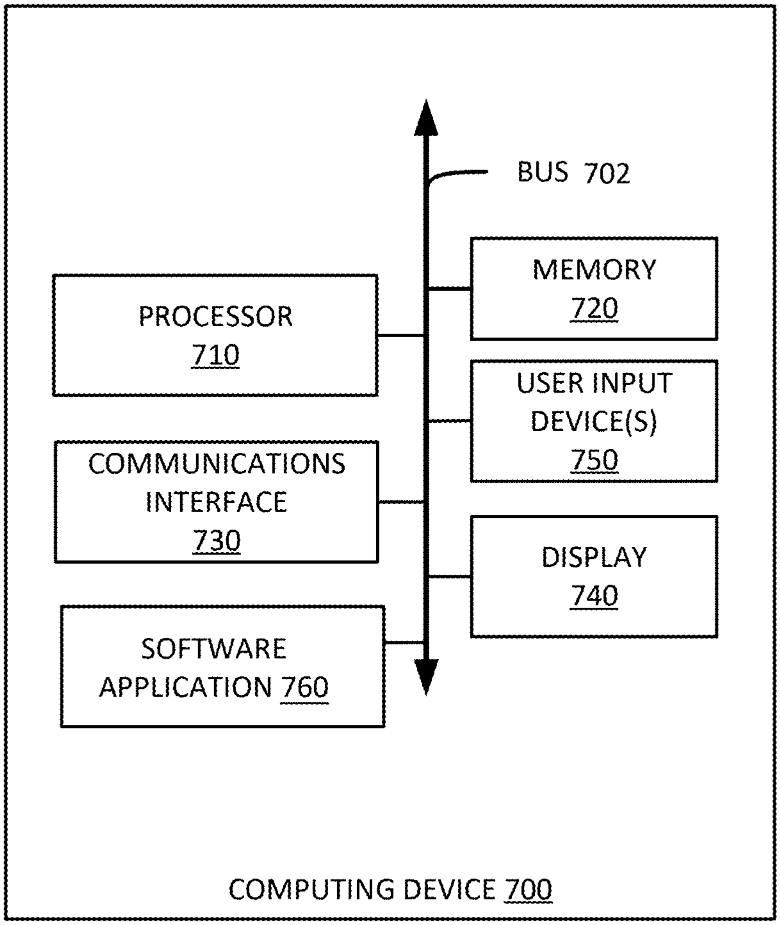
FIG. 7 shows an example computing device suitable for performing certain aspects of the present disclosure.

Referring now to FIG. 7, FIG. 7 shows an example computing device 700 suitable for performing certain aspects of the present disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more processes described herein, such as part or all of the example process 400 described above with respect to FIG. 4, or the example process 500A or 500B described above with respect to FIG. 5, or the example process 600A, 600B, 600C, or 600D described above with respect to FIG. 6. For example, the software application 760 provided on the computing device 700 may provide instructions for performing one or more steps of the processes 400, 500A, 500B, 600A, 600B, 600C, or 600D. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method performed by one or more computing device, the method comprising: establishing a mesh network for a set of client computing devices from a plurality of client computing devices based on communication among the plurality of client computing devices, each of the plurality of computing devices having a particular file installed or stored, the mesh network comprising a parent client computing device and a plurality of child client computing devices; determining, for each client computing device of the set of client computing devices, a target version of the particular file to be installed or stored on the client computing device; and causing the target versions of the particular file to be distributed to the set of client computing devices through the mesh network, wherein distributing the target versions of the particular file comprises: downloading, by the parent client computing device from a content distribution service, the target version of the particular file for the parent client computing device and the target versions of the particular file for the plurality of child client computing devices; downloading, by a child client computing device in the plurality of child client computing devices, the target version of the particular file for the client computing device from the parent client computing device; and verifying, by the child client computing device, authenticity of the downloaded target version of the particular file with the content distribution service.

Example #2: The method of Example #1, wherein the particular file is a software application installed on the respective client computing devices, and wherein the target version of the particular file for at least one child client computing device is incompatible with the parent client computing device.

Example #3: The method of Examples #1-2, wherein establishing the mesh network for the set of client computing devices comprises: receiving network information from each of the plurality of client computing devices, the network information of a client computing device comprising an IP address of the client computing device and a subnet of the client computing device; receiving multicast responses among the plurality of client computing devices; and identifying the set of client computing devices from the plurality of client computing devices based on determining that the set of client computing devices are in a same local network based, at least in part, upon the multicast responses.

Example #4: The method of Examples #1-3, wherein establishing the mesh network for the set of client computing devices further comprises: determining the parent client computing device and the plurality of child client computing devices from the set of client computing devices based on configurations of the respective client computing devices in the set of client computing devices.

Example #5: The method of Examples #1-3, wherein verifying the authenticity of the target version of the particular file with the content distribution service comprises: hashing the downloaded target version of the particular file for the child client computing device to generate a hash; transmitting the hash to the content distribution service; and receiving a verification result from the content distribution service regarding the authenticity of the downloaded target version of the particular file; and wherein distributing the target versions of the particular file further comprises installing, by the child client computing device, the downloaded target version of the particular file based on the verification result indicating that the downloaded target version is authentic.

Example #6: The method of Examples #1-5, further comprising updating the mesh network by: receiving updated network information from each of the plurality of client computing devices; receiving additional multicast responses among the plurality of client computing devices; identifying an updated set of client computing devices from the plurality of client computing devices based on determining that the updated set of client computing devices are in a same local network based, at least in part, upon the additional multicast responses; and determining the parent client computing device and the plurality of child client computing devices from the updated set of client computing devices based on configurations of the respective client computing devices in the updated set of client computing devices.

Example #7: The method of Examples #1-7, wherein distributing the target versions of the particular file further comprises: determining, by a child client computing device in the plurality of child client computing devices, that the parent client computing device is unavailable; and downloading, by the child client computing device, the target version of the particular file for the client computing device from a secondary parent client computing device in the mesh network.

Example #8: The method of Examples #1-7, wherein distributing the target versions of the particular file further comprises: determining, by a child client computing device in the plurality of child client computing devices, that no parent client computing device is available in the mesh network; and downloading, by the child client computing device, the target version of the particular file for the client computing device from the content distribution service.

Example #9: The method of Examples #1-8, wherein the particular file comprises a software, an image, a video, or an audio.

Example #10: A system comprising: a non-transitory computer-readable medium; and a processor communicatively coupled to the non-transitory computer-readable medium, the processor configured to execute processor-executable instructions stored in the non-transitory computer-readable medium to: establish a mesh network for a set of client computing devices from a plurality of client computing devices based on communication among the plurality of client computing devices, each of the plurality of client computing devices having a particular file installed or stored, the mesh network comprising a parent client computing device and a plurality of child client computing devices; determine, for each client computing device of the set of client computing devices, a target version of the particular file to be installed or stored on the client computing device; and cause the target versions of the particular file to be distributed to the set of client computing devices through the mesh network, wherein distributing the target versions of the particular file comprises: downloading, by the parent client computing device from a content distribution service, the target version of the particular file for the parent client computing device and the target versions of the particular file for the plurality of child client computing devices; downloading, by a child client computing device in the plurality of child client computing devices, the target version of the particular file for the client computing device from the parent client computing device; and verifying, by the child client computing device, authenticity of the downloaded target version of the particular file with the content distribution service.

Example #11: The system of Example #10, wherein the particular file is a software application installed on the respective client computing devices, and wherein the target version of the particular file for at least one child client computing device is incompatible with the parent client computing device.

Example #12: The system of Examples #10-11, wherein establishing the mesh network for the set of client computing devices comprises: receiving network information from each of the plurality of client computing devices, the network information of a client computing device comprising an IP address of the client computing device and a subnet of the client computing device; receiving multicast responses among the plurality of client computing devices; and identifying the set of client computing devices from the plurality of client computing devices based on determining that the set of client computing devices are in a same local network based, at least in part, upon the multicast responses.

Example #13: The system of Examples #10-12, wherein verifying the authenticity of the target version of the particular file with the content distribution service comprises: hashing the downloaded target version of the particular file for the child client computing device to generate a hash; transmitting the hash to the content distribution service; and receiving a verification result from the content distribution service regarding the authenticity of the downloaded target version of the particular file; and wherein distributing the target versions of the particular file further comprises installing, by the child client computing device, the downloaded target version of the particular file based on the verification result indicating that the downloaded target version is authentic.

Example #14: The system of Examples #10-13, wherein distributing the target versions of the particular file further comprises: determining, by a child client computing device in the plurality of child client computing devices, that no parent client computing device is available in the mesh network; and downloading, by the child client computing device, the target version of the particular file for the client computing device from the content distribution service.

Example #15: The system of Examples #10-14, wherein distributing the target versions of the particular file further comprises: determining, by a child client computing device in the plurality of child client computing devices, that the parent client computing device is unavailable; and downloading, by the child client computing device, the target version of the particular file for the client computing device from a secondary parent client computing device in the mesh network.

Example #16: A non-transitory computer-readable medium comprising processor-executable instructions configured to cause one or more processors to: establish a mesh network for a set of client computing devices from a plurality of client computing devices based on communication among the plurality of client computing devices, each of the plurality of client computing devices having a particular file installed or stored, the mesh network comprising a parent client computing device and a plurality of child client computing devices; determine, for each client computing device of the set of client computing devices, a target version of the particular file to be installed or stored on the client computing device; and cause the target versions of the particular file to be distributed to the set of client computing devices through the mesh network, wherein distributing the target versions of the particular file comprises: downloading, by the parent client computing device from a content distribution service, the target version of the particular file for the parent client computing device and the target versions of the particular file for the plurality of child client computing devices; downloading, by a child client computing device in the plurality of child client computing devices, the target version of the particular file for the client computing device from the parent client computing device; and verifying, by the child client computing device, authenticity of the downloaded target version of the particular file with the content distribution service.

Example #17: The non-transitory computer-readable medium of Example #16, wherein the particular file is a software application installed on the respective client computing devices, and wherein the target version of the particular file for at least one child client computing device is incompatible with the parent client computing device.

Example #18: The non-transitory computer-readable medium of Examples #16-17, wherein establishing the mesh network for the set of client computing devices comprises: receiving network information from each of the plurality of client computing devices, the network information of a client computing device comprising an IP address of the client computing device and a subnet of the client computing device; receiving multicast responses among the plurality of client computing devices; and identifying the set of client computing devices from the plurality of client computing devices based on determining that the set of client computing devices are in a same local network based, at least in part, upon the multicast responses.

Example #19: The non-transitory computer-readable medium of Examples #16-18, wherein verifying the authenticity of the target version of the particular file with the content distribution service comprises: hashing the downloaded target version of the particular file for the child client computing device to generate a hash; transmitting the hash to the content distribution service; and receiving a verification result from the content distribution service regarding the authenticity of the downloaded target version of the particular file; and wherein distributing the target versions of the particular file further comprises installing, by the child client computing device, the downloaded target version of the particular file based on the verification result indicating that the downloaded target version is authentic.

Example #20: The non-transitory computer-readable medium of Examples #16-19, wherein distributing the target versions of the particular file further comprises: determining, by a child client computing device in the plurality of child client computing devices, that no parent client computing device is available in the mesh network; and downloading, by the child client computing device, the target version of the particular file for the client computing device from the content distribution service.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases “in one example,” “in an example,” “in one implementation,” or “in an implementation,” or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by one or more computing device, the method comprising:

establishing, by a mesh service, a mesh network for a set of client computing devices from a plurality of client computing devices based on communication among the plurality of client computing devices, each of the plurality of computing devices having a particular file installed or stored, the establishing comprising transmitting an instruction to a first client computing device to operate as a parent client computing device and transmitting instructions to each of the other computing devices of the plurality of client computing devices to operate as a child client computing device;

determining, by the mesh service for each client computing device of the set of client computing devices, a target version of the particular file to be installed or stored on the client computing device; and causing, by the mesh service, the target versions of the particular file to be distributed to the set of client computing devices through the mesh network, wherein distributing the target versions of the particular file comprises:

transmitting, by the mesh service to the parent client computing device from a content distribution service, the target version of the particular file for the parent client computing device and the target versions of the particular file for the respective child client computing devices;

transmitting, by the mesh service to each child client computing device, an indication to download a respective target version of the particular file from the parent client computing device;

receiving, by the mesh service from a plurality of child client computing devices, requests to verify an authenticity of a respective downloaded target version of the particular file, the respective downloaded target version downloaded by the respective child client computing device from the parent client computing device; and responding, by the mesh service, to each request to verify the authenticity.

2. The method of claim 1, wherein the particular file is a software application installed on the respective client computing devices, and wherein the target version of the particular file for at least one child client computing device is incompatible with the parent client computing device.

3. The method of claim 1, wherein establishing the mesh network for the set of client computing devices comprises:

receiving network information from each of the plurality of client computing devices, the network information of a client computing device comprising an IP address of the client computing device and a subnet of the client computing device;

receiving multicast responses among the plurality of client computing devices; and identifying the set of client computing devices from the plurality of client computing devices based on determining that the set of client computing devices are in a same local network based, at least in part, upon the multicast responses.

4. The method of claim 3, wherein establishing the mesh network for the set of client computing devices further comprises:

determining the parent client computing device and the plurality of child client computing devices from the set of client computing devices based on configurations of the respective client computing devices in the set of client computing devices.

5. The method of claim 1, further comprising verifying the authenticity of the target version of the particular file, comprising:

receiving a hash of the downloaded target version of the particular file for the respective child client computing device;

verifying the hash.

6. The method of claim 1, further comprising updating the mesh network by:

receiving updated network information from each of the plurality of client computing devices;

receiving additional multicast responses among the plurality of client computing devices;

identifying an updated set of client computing devices from the plurality of client computing devices based on determining that the updated set of client computing devices are in a same local network based, at least in part, upon the additional multicast responses; and determining the parent client computing device and the plurality of child client computing devices from the updated set of client computing devices based on configurations of the respective client computing devices in the updated set of client computing devices.

7. The method of claim 1, wherein distributing the target versions of the particular file further comprises:

determining, by a child client computing device in the plurality of child client computing devices, that the parent client computing device is unavailable; and downloading, by the child client computing device, the target version of the particular file for the client computing device from a secondary parent client computing device in the mesh network.

8. The method of claim 1, wherein distributing the target versions of the particular file further comprises:

determining, by a child client computing device in the plurality of child client computing devices, that no parent client computing device is available in the mesh network; and downloading, by the child client computing device, the target version of the particular file for the client computing device from the content distribution service.

9. The method of claim 1, wherein the particular file comprises a software, an image, a video, or an audio.

10. A system comprising:

a non-transitory computer-readable medium; and a processor communicatively coupled to the non-transitory computer-readable medium, the processor configured to execute processor-executable instructions stored in the non-transitory computer-readable medium to:

establish, by a mesh service, a mesh network for a set of client computing devices from a plurality of client computing devices based on communication among the plurality of client computing devices, each of the plurality of computing devices having a particular file installed or stored, the establishing comprising transmitting an instruction to a first client computing device to operate as a parent client computing device and transmitting instructions to each of the other computing devices of the plurality of client computing devices to operate as a child client computing device;

determine, by the mesh service for each client computing device of the set of client computing devices, a target version of the particular file to be installed or stored on the client computing device; and cause, by the mesh service, the target versions of the particular file to be distributed to the set of client computing devices through the mesh network, wherein the processor-executable instructions configured to cause the processor to distribute the target versions of the particular file comprises processor-executable instructions configured to cause the processor to:

transmit, by the mesh service to the parent client computing device from a content distribution service, the target version of the particular file for the parent client computing device and the target versions of the particular file for the respective child client computing devices;

transmit, by the mesh service to each child client computing device, an indication to download a respective target version of the particular file from the parent client computing device;

receive, by the mesh service from a plurality of child client computing devices, requests to verify an authenticity of a respective downloaded target version of the particular file, the respective downloaded target version downloaded by the respective child client computing device from the parent client computing device; and respond, by the mesh service, to each request to verify the authenticity.

11. The system of claim 10, wherein the particular file is a software application installed on the respective client computing devices, and wherein the target version of the particular file for at least one child client computing device is incompatible with the parent client computing device.

12. The system of claim 10, wherein the processor-executable instructions configured to cause the processor to establish the mesh network for the set of client computing devices comprises processor-executable instructions configured to cause the processor to:

receive network information from each of the plurality of client computing devices, the network information of a client computing device comprising an IP address of the client computing device and a subnet of the client computing device;

receive multicast responses among the plurality of client computing devices; and identify the set of client computing devices from the plurality of client computing devices based on determining that the set of client computing devices are in a same local network based, at least in part, upon the multicast responses.

13. The system of claim 10, wherein the processor-executable instructions configured to cause the processor to verify the authenticity of the target version of the particular file with the content distribution service comprises processor-executable instructions configured to cause the processor to:

receive a hash of the downloaded target version of the particular file for the respective child client computing device;

verify the hash.

14. The system of claim 10, wherein the processor-executable instructions configured to cause the processor to distribute the target versions of the particular file further processor-executable instructions configured to cause the processor to:

determine, by a child client computing device in the plurality of child client computing devices, that no parent client computing device is available in the mesh network; and download, by the child client computing device, the target version of the particular file for the client computing device from the content distribution service.

15. The system of claim 10, wherein the processor-executable instructions configured to cause the processor to distributing the target versions of the particular file further comprises processor-executable instructions configured to cause the processor to:

determine, by a child client computing device in the plurality of child client computing devices, that the parent client computing device is unavailable; and download, by the child client computing device, the target version of the particular file for the client computing device from a secondary parent client computing device in the mesh network.

16. A non-transitory computer-readable medium comprising processor-executable instructions configured to cause one or more processors to:

establish, by a mesh service, a mesh network for a set of client computing devices from a plurality of client computing devices based on communication among the plurality of client computing devices, each of the plurality of computing devices having a particular file installed or stored, the establishing comprising transmitting an instruction to a first client computing device to operate as a parent client computing device and transmitting instructions to each of the other computing devices of the plurality of client computing devices to operate as a child client computing device;

determine, by the mesh service for each client computing device of the set of client computing devices, a target version of the particular file to be installed or stored on the client computing device; and cause, by the mesh service, the target versions of the particular file to be distributed to the set of client computing devices through the mesh network, wherein the processor-executable instructions configured to cause the processor to distribute the target versions of the particular file comprises processor-executable instructions configured to cause the processor to:

transmit, by the mesh service to the parent client computing device from a content distribution service, the target version of the particular file for the parent client computing device and the target versions of the particular file for the respective child client computing devices;

transmit, by the mesh service to each child client computing device, an indication to download a respective target version of the particular file from the parent client computing device;

receive, by the mesh service from a plurality of child client computing devices, requests to verify an authenticity of a respective downloaded target version of the particular file, the respective downloaded target version downloaded by the respective child client computing device from the parent client computing device; and respond, by the mesh service, to each request to verify the authenticity.

17. The non-transitory computer-readable medium of claim 16, wherein the particular file is a software application installed on the respective client computing devices, and wherein the target version of the particular file for at least one child client computing device is incompatible with the parent client computing device.

18. The non-transitory computer-readable medium of claim 16, wherein the processor-executable instructions configured to cause the processor to establish the mesh network for the set of client computing devices comprises processor-executable instructions configured to cause the processor to:

receive network information from each of the plurality of client computing devices, the network information of a client computing device comprising an IP address of the client computing device and a subnet of the client computing device;

receive multicast responses among the plurality of client computing devices; and identify the set of client computing devices from the plurality of client computing devices based on determining that the set of client computing devices are in a same local network based, at least in part, upon the multicast responses.

19. The non-transitory computer-readable medium of claim 16, wherein the processor-executable instructions configured to cause the processor to verify the authenticity of the target version of the particular file with the content distribution service comprises processor-executable instructions configured to cause the processor to:

receive a hash of the downloaded target version of the particular file for the respective child client computing device;

verify the hash.

20. The non-transitory computer-readable medium of claim 16, wherein the processor-executable instructions configured to cause the processor to distribute the target versions of the particular file further processor-executable instructions configured to cause the processor to:

determine, by a child client computing device in the plurality of child client computing devices, that no parent client computing device is available in the mesh network; and download, by the child client computing device, the target version of the particular file for the client computing device from the content distribution service.

* * * * *